April 5, 1932.  H. E. TWOMLEY  1,852,034
CONVEYER SYSTEM
Original Filed Feb. 21, 1931
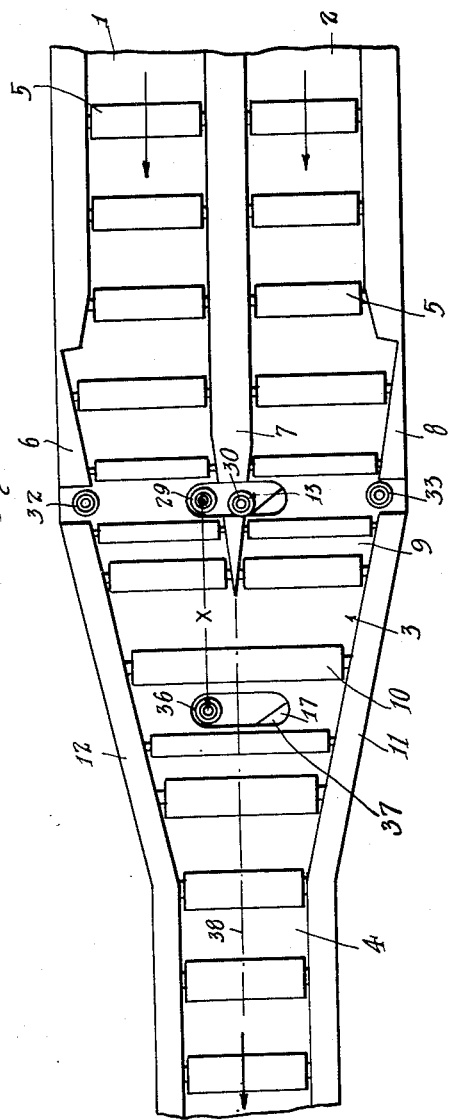
Inventor
Herbert E. Twomley
By Lyon & Lyon
Attorneys Patented Apr. 5, 1932

1,852,034

UNITED STATES PATENT OFFICE

HERBERT E. TWOMLEY, OF RIVERSIDE, CALIFORNIA, ASSIGNOR TO CLARA B. PARKER, OF RIVERSIDE, CALIFORNIA, AS EXECUTRIX OF THE ESTATE OF GEORGE D. PARKER, DECEASED

CONVEYER SYSTEM

Original application filed February 21, 1931, Serial No. 517,397. Divided and this application filed December 2, 1931. Serial No. 578,468.

My invention relates to roller conveyers and has particular reference to a device for preventing collisions between packages or other articles moving along two separate chutes which terminate in a single opening or continuation of the conveyer system.

This application is a division of my co-pending application, Serial No. 517,397, filed February 21, 1931.

In roller conveyers, it is common practice to have conveyers extending from several spaced points to a common conveyer chute upon which packages or parcels from such different points will be conveyed along the continuation of the chute. Ordinarily, the continuation of the chute is formed to accommodate in its width only the same size of package or parcel as was accommodated by either one of the feeder chutes or conveyers so that it is necessary to provide some means at the junction of the feeder chutes to prevent collision between the parcels arriving from the different conveyers.

It is, therefore, an object of my invention to provide means for a branched conveyer chute to prevent collision between parcels arriving simultaneously at the junction of the chutes.

Another object of my invention is to provide a branched conveyer chute with means for positively stopping parcels on either of the chutes to thereby prevent collision between parcels from different chutes attempting to enter the junction at the same time.

Another object of the invention is to provide a branched conveyer chute with means for positively stopping parcels passing along the chutes to prevent collision thereof at the junction of the chutes and to insure the clearance of any given parcel entering from one chute before parcels are permitted to enter from the other chute.

Other objects and advantages will be apparent from a study of the following specification, read in connection with the accompanying drawings, wherein—

Figure 1 is a top plan view of a conveyer system constructed in accordance with my invention; and Figure 2 is a bottom plan view of the conveyer shown in Figure 1.

Referring to the drawings, I have illustrated in Figure 1, a branched conveyer as comprising a pair of feeder chutes 1 and 2, a section of which is illustrated, it being understood that these feeder conveyers extend from certain stations in a factory or other establishment where the conveyer is employed, at which stations parcels, boxes or packages, or other articles, will be placed upon one or the other of the conveyer chutes. While the chutes 1 and 2 are illustrated as being very close together, it is assumed that these two chutes may extend from widely separated points, if desired.

The conveyer chutes 1 and 2 are illustrated as discharging into a junction 3 which constitutes the entrance of a continuation of the conveyer by way of a continuing chute 4. It is assumed that the direction of movement of parcels upon the conveyer is in the direction of the arrows appearing on Fig. 1.

The type of conveyer illustrated is that known as a roller conveyer, each of the conveyer chutes being provided with a plurality of rollers 5, which may be driven in any suitable manner and which are arranged with their axes substantially parallel to each other and at right angles to the direction of motion of parcels to be conveyed thereover. Parcels are prevented from slipping from the rollers 5 as by means of the guide rails 6, 7 and 8, of which rail 7 is indicated in Fig. 1 as constituting a joint rail for both chutes 1 and 2.

The junction 3 is illustrated as comprising a substantially funnel-like conveyer, its inner or approaching end 9 being constructed with a width equal to the sum of the width of the feeder chutes 1 and 2 so that provision is made to permit simultaneous entry of parcels from both of the chutes 1 and 2. This junction 3 is also illustrated as being provided with rollers 10, each of which is mounted and driven similar to those indicated at 5, but the length of which corresponds substantially to the width of the conveyer junction section.

As will be readily apparent from an inspection of Fig. 1, the guides 11 and 12, constituting the sides of the junction 3, are positioned angularly relative to each other to guide parcels entering the junction into the proper position to enter the continuing chute 4. The continuing chute 4 is constructed similarly to either the chute 1 or 2 and is illustrated as being of a width substantially equal to the width of either one of the feeder chutes.

If parcels were permitted to pass simultaneously from both of the chutes 1 and 2 into the junction 3, it would be readily apparent that these parcels would engage the guides 11 and 12 and would be brought into contact with each other with the result that the junction 3 would become blocked and thus prevent any of the parcels from passing into the continuing chute 4.

In this form of my invention, side rollers 32 and 33 are inset respectively in the guides 6 and 8 to facilitate passage of parcels through their angular motion upon entry into the junction 3. It will be observed that when a parcel engages roller 30 and moves the plate 31 to the left, the distance between the rollers 30 and 33 will be such as to permit passage of the parcel therebetween.

It will be observed that a second plate 34, similar to plate 31, is illustrated as being pivotally mounted, as at 35, somewhat beyond the plate 31. Secured to the plate 34 is a single roller 36 which projects upwardly through a slot 37 in the conveyer floor to such position as will permit it to engage parcels passing over the conveyer through the junction 3. The roller 36 is permitted a limited movement to the right and to the left of the center line 38 through the junction 3 by such a distance as will permit a parcel or box to pass between it and the opposite guide 11 or 12 on the junction 3. That is, in the position illustrated in Fig. 1, the roller 36 will permit a parcel from the chute 2 to pass between the roller 36 and the guide 39.

By referring again to Fig. 2, it will be observed that the plate 34, to which the roller 36 is attached, is connected to the plate 31 supporting rollers 29 and 30 as by means of a pair of connecting links 40 and 41. These links are each pivotally secured to the plate 34, as is indicated at 42, at some distance laterally from the pivot 35 of the plate 34. Correspondingly, the opposite end of the link 40 is connected to the plate 31 at a point laterally spaced from the pivot 43 for this plate. The selection of the distances of spacing of the links 40 and 41 from the pivot points of the plates to which they are attached, may be variably selected to insure that a desired movement of the rollers 29 and 30 produces a corresponding desired movement of the roller 36.

The amount of space in the longitudinal direction between the rollers 29—30 and roller 36 (indicated by the arrow X on Fig. 1), is selected to correspond to the length of the parcel or box to be handled by the conveyer.

The operation of this form of the device is such that a parcel approaching on the feeder chute 2 will engage the roller 30, move the plate 31 to the left so as to permit passage of the parcel between rollers 30 and 33 and thus allow the parcel to enter the junction 3. Displacement of the rollers 29 and 30 will, through the linked connection 40—41 to the plate 34 cause a simultaneous movement of the roller 36 to its left-hand position to permit the parcel to pass between the roller 36, guide 39 and thus pass to the continuing conveyer 4. However, during the passage of the parcel from rollers 30—33 to a point at which it clears the roller 36, any parcels approaching upon the feeder chute 1 will be prevented from entering the junction 3 even though they should strike roller 29. In other words, the impact upon roller 29 will not move the rollers 29—30 to the right until after the first parcel has cleared the roller 36. Thus, the first parcel to enter the injunction will positively prevent the entry of a parcel from the other feeder chute until this first parcel has cleared the junction 3 a sufficient distance to insure against sideways collision by parcels from the opposite chute.

From the foregoing description, it will be observed that the underlying principle of my invention is the provision of a positive stop for one or the other of the chutes to engage and stop the parcels passing thereover to prevent simultaneous entry of parcels from both chutes, and this prevents both damage to the parcels and jamming of the conveyer system requiring manual assistance before the system may again be operated.

It will be further observed that I have provided a system in which not only such jamming is prevented, but also danger of sidewise collision is prevented by insuring the stoppage of parcels from one chute until after parcels in the other chute have moved to such distance as will insure spacing of these parcels from any other parcels entering from the opposite chute.

While I have illustrated and described the preferred embodiment of my invention, I do not desire to be limited to any of the details shown or described herein, except as defined in the appended claims.

I claim:

1. In a conveyer system in which several branch conveyers converge into a single continuing conveyer, stopping means for obstructing said branch conveyers, said stopping means comprising a plate pivotally mounted beneath said conveyer, a pair of rollers mounted upon said plate and projecting upwardly into said conveyers in such position as to obstruct both of said branch conveyers whereby engagement of said rollers by parcels entering from one of said branch conveyers will move said plate to permit said parcel to pass said rollers and to obstruct passage of parcels through the other of said branch conveyers, a second plate pivoted beneath said conveyer and spaced from said first plate in the direction of movement of parcels over said conveyer system, a roller on said second plate extending into obstructing position relative to said conveyers, and means connecting said two plates whereby said first plate is prevented from moving to a position to release parcels from said second branch conveyer until parcels from said first conveyer have passed the roller on said second plate.

2. In a conveyer system in which several branch conveyers converge into a single continuing conveyer, stopping means for obstructing said branch conveyers, said stopping means comprising a plate pivotally mounted beneath said conveyer, a pair of rollers mounted upon said plate and projecting upwardly into said conveyers in such position as to obstruct both of said branch conveyers whereby engagement of said rollers by parcels entering from one of said branch conveyers will move said plate to permit said parcel to pass said rollers and to obstruct passage of parcels through the other of said branch conveyers, an additional roller, means mounting said roller to extend into parcel engaging position on either of said branch conveyers in spaced relation from said first named rollers in the direction of movement of parcels on said conveyers, and means interconnecting said last named roller and said plate whereby said plate is prevented from moving to a position to release parcels from said second branch conveyer until parcels from said first conveyer have passed said last named roller.

Signed at Riverside, California, this 24th day of November, 1931.

HERBERT E. TWOMLEY.